Patented Dec. 12, 1950

2,533,211

UNITED STATES PATENT OFFICE 2,533,211

PROCESS FOR SULFONATING POLYSTYRENE

Massimo Baer, Springfield, Mass., assignor to Monsanto Chemical Company, St. Louis, Mo., a corporation of Delaware No Drawing. Application August 11, 1949, Serial No. 109,812

3 Claims. (Cl. 260—79.3)

This invention relates to a process for preparing sulfonated polystyrene. More particularly, the invention relates to a process for preparing water-soluble sulfonated polystyrene.

Prior methods for sulfonating polystyrene, using either sulfuric acid, sulfur trioxide or chlorosulfonic acid as the sulfonating agent have been quite successful in preparing sulfonated polystyrenes which were insoluble in water and were useful as ion exchange resins. However, using these reagents, it was found almost impossible to obtain water-soluble polystyrenes which could be freed from the sulfonating agents. For example, the excess sulfuric acid used in the sulfonation of polystyrene cannot be removed from the product by any of the conventional methods for separating sulfonic acids from sulfuric acids.

It is an object of this invention to provide a process for sulfonating polystyrene.

A further object of this invention is to provide a process for preparing water-soluble sulfonated polymers of styrene.

These and other objects are attained by sulfonating a solid polymerized styrene in a chlorinated solvent using a complex of sulfur trioxide and dioxane as a sulfonating agent.

The following examples are given in illustration of this invention and are not intended as limitations upon the scope thereof. Where parts are mentioned, they are parts by weight.

Example I

A coordination complex of dioxane and sulfur trioxide was prepared by dissolving 46 parts (0.5 mol) of dioxane in approximately 2000 parts of ethylene dichloride, cooling the solution to about 5° C. and adding to the cooled solution 80 parts (1 mol) of liquid sulfur trioxide with constant stirring and at such a rate that the temperature of the reaction mixture remained at about 5° C. throughout the reaction. Inasmuch as the reaction was quite exothermic, it was necessary to cool the reaction vessel. The product of this reaction was a solution in ethylene dichloride of a coordination complex of dioxane and sulfur trioxide in a molar ratio of approximately 1:2. The solution thus made was cooled to about −5° C. and 104 parts (1 mol, based on the monomeric styrene unit) of solid polystyrene having a molecular weight of about 65,000 dissolved in ethylene dichloride (about a 10% solution) was added rapidly to the solution containing the sulfur trioxide complex, with constant stirring. During this addition, the temperature of the reaction medium rose to about +5° C. and finely divided sulfonated polymer came out of solution and remained suspended in the solvent in the form of a slurry. The temperature of the slurry was then raised to about 15° C. over a period of about 25 minutes and the sulfonated polymer was recovered from the ethylene dichloride by filtration. The recovered sulfonated polymer was dissolved in water and the retained solvent was removed by steam distillation. The product was a clear, viscous solution, free from gelatinous material. The solution was made neutral with sodium hydroxide and the water was removed by evaporation. The product was a clear, slightly yellow, hard solid which, upon analysis, was found to contain an average of 0.7 sodium sulfonate group per styrene unit.

Example II

The process as in Example I was repeated except that the amount of dioxane was 68 parts (.77 mol) and the amount of sulfur trioxide was 120 parts (1.5 mols). The product contained 0.9 sodium sulfonate group per styrene unit.

Example III

Example I was repeated except that the amount of dioxane was 32 parts (0.36 mol) and the amount of sulfur trioxide was 56 parts (0.7 mol). The product contained approximately 0.5 sodium sulfonate group per styrene unit.

The products of each of the examples were completely soluble in water whether they were tested in the form of a free acid or of the sodium salt thereof.

Any solid polymerized styrene may be used in the process of this invention to provide a soluble sulfonated polymer provided that the polystyrene is soluble in chlorinated solvents such as ethylene dichloride, carbon tetrachloride, tetrachlorethane, chloroform, etc. As a general rule, polymerized styrene having a molecular weight of from about 5000 to about 500,000, as determined by the Staudinger equation, may be employed in this process.

As shown above, the process must be carried out in a chlorinated, aliphatic, hydrocarbon solvent such as ethylene dichloride, chloroform, carbon tetrachloride, tetrachlorethane, etc. The amount of solvent used is not critical although there must be enough solvent present to provide for easy handling of the reaction. In other words, too viscous solutions might prevent the homogeneous dispersion of the reaction components throughout the reaction solution and might also make it difficult to prevent overheating during the reaction.

The dioxane-sulfur trioxide complex is best prepared, as shown in Example I, by adding sulfur trioxide to a solution of the dioxane in a chlorinated solvent at temperatures between $-10°$ C. and $+10°$ C. The ratio of sulfur trioxide to dioxane may be varied within the range of one mol of sulfur trioxide to from 0.5 to 2 mols of the dioxane. If less than 0.5 mol of dioxane is used in the sulfonation reaction, it is too violent even at temperatures as low as $-20°$ C. and undesirable products are produced; if more than 2 mols of the dioxane are employed to make the coordination complex, sulfonation of the polystyrene is extremely slow and incomplete.

The temperature of the sulfonation reaction must be carefully controlled within the range of from about $-15°$ C. to about $+10°$ C. The sulfonation may be started at temperatures below $-15°$ C. but it is too slow to be practical. At temperatures above $+10°$ C., degradation of the polymer takes place and undesirable products are formed.

The extent of the sulfonation may be controlled by varying the ratio of solid polystyrene to sulfonating agent. In the examples, 104 parts (1 mol) of polystyrene was used for from 56 to 120 parts (0.7 to 1.5 mols) of sulfur trioxide. On a basis of 104 parts (1 mol, based on the monomeric styrene unit) of polystyrene, from 40 to 320 parts (0.5 to 4 mols) of sulfur trioxide may be used to obtain products having an average of from 0.5 to 2 sulfonic acid groups per styrene unit.

The sequence of the reaction steps shown in Example I may be varied to the extent that the polystyrene solution and the sulfur trioxide complex may be added concurrently to the reaction vessel. However, if the sulfur trioxide complex is added to the polystyrene solution, it is almost impossible to prevent the preparation of insoluble sulfonated polystyrenes.

The viscosity of the sulfonated polystyrene may be varied over an extremely wide range dependent in part upon the molecular weight of the polystyrene. For example, a polystyrene having a molecular weight of about 11,000 yields a water-soluble sulfonated product having a viscosity in the neighborhood of 10 centipoises in a 20% aqueous solution. On the other hand, a 2% solution of the water-soluble sulfonated polystyrene, wherein the polystyrene has a molecular weight of about 400,000, has a viscosity of about 250 poises.

The viscosity of the sulfonated polystyrene may be further controlled by varying the slurrying time and conditions after all of the polystyrene has been added. Thus, in the examples, the sulfonated polystyrene was agitated as a slurry in ethylene dichloride for about 30 minutes as the temperature was being raised to 15° C. To increase the viscosity of the sulfonated polystyrene, the agitation may be continued for short periods of time while maintaining a temperature of from 15° C. to 60° C. If the slurrying is continued for too long a time, an insoluble sulfonated polystyrene is formed. For example, the viscosity of a 10% aqueous solution of the product of Example I was about 250 centipoises. By increasing the slurrying time by about 15 minutes and raising the temperature to 35° C., a viscosity of about 500 centipoises can be obtained and by further slurrying the product at 55° C. for about 10 minutes, the viscosity can be raised to about 1000 centipoises. By further slurrying at 55° C., the viscosity may be raised to 15,000 or more centipoises.

The process of this invention provides a means for preparing water-soluble sulfonated polystyrenes from a wide range of solid polymers of styrene, said sulfonated polymers having a wide range of viscosities. The process is also advantageous in that the sulfonated polymer is insoluble in the solvent in which it is prepared and therefore an easy means for separating the product from the excess sulfonating agent is attained.

The products of this invention may be used as the free acid or alkali metal salts thereof, including the lithium, sodium, potassium, rubidium and cesium salts. The products are useful as sizing agents, protective colloids, adhesives, dispersing agents, thickening agents and tanning agents.

It is obvious that many variations may be made in the products and processes of this invention without departing from the spirit and scope thereof, as defined in the appended claims.

What is claimed is:

1. A process which comprises sulfonating solid polymers of styrene by reacting said polymers at temperatures from $-15°$ C. to $+5°$ C. in a chlorinated, aliphatic, organic solvent with a complex of sulfur trioxide and dioxane containing from 0.5 to 2 mols of dioxane per mol of sulfur trioxide.

2. A process as in claim 1 wherein the molar ratio of dioxane to sulfur trioxide is 1:2.

3. A process which comprises sulfonating solid polymers of styrene by reacting said polymers at temperatures from $-15°$ C. to $+5°$ C. in a chlorinated, aliphatic, organic solvent with a complex of sulfur trioxide and dioxane containing from 0.5 to 2 mols of dioxane per mol of sulfur trioxide and then increasing the viscosity of the product by heating it at from 15 to 60° C. with constant agitation.

MASSIMO BAER.

REFERENCES CITED

The following references are of record in the file of this patent:

UNITED STATES PATENTS

| Number | Name | Date |
| --- | --- | --- |
| 2,283,236 | Soday | May 19, 1942 |
| 2,475,886 | Goebel | July 12, 1949 |

FOREIGN PATENTS

| Number | Country | Date |
| --- | --- | --- |
| 580,366 | Germany | July 13, 1933 |

OTHER REFERENCES

Suter et al., J. Am. Chem. Soc., 60, 538–40 (1938).